March 7, 1950     J. J. BLACK     2,499,625
PROP FOR TRAILERS

Filed July 4, 1944     2 Sheets-Sheet 1

INVENTOR.
James J. Black
BY
Wood, Arey, Huron & Evans
Attorneys

Patented Mar. 7, 1950

2,499,625

UNITED STATES PATENT OFFICE 2,499,625

PROP FOR TRAILERS

James J. Black, Cincinnati, Ohio, assignor to The Trailmobile Company, Cincinnati, Ohio, a corporation of Delaware Application July 4, 1944, Serial No. 543,501

3 Claims. (Cl. 254—86)

This invention relates to a prop or landing gear construction for supporting the front end of road vehicles, particularly a vehicle such as a semi-trailer, which is left positioned for loading and unloading, after detachment from the tractor. The particular type of prop to which this invention relates is the manually operable type as distinguished from a structure which is elevated and lowered automatically upon coupling and uncoupling with the tractor.

More specifically this invention contemplates certain improvements in props of the telescoping, tubular type. Props of this type are strong and sure in their operation and comparatively easy to manipulate. However, by their very design they are expensive to construct as they are usually made from cast steel tops with tubular bottoms. Also, the problem of supplying lubricant to the operative mechanism is one which has always caused substantial difficulties.

One of the objects of the present invention has been the provision of a prop construction which does not sacrifice strength or rigidity and yet is comparatively inexpensive to build, being made in its entirely of pressed, rolled, and formed steel, except for the actuating screw and related parts.

Another object of the invention has been the provision of outer and inner tubular members which are square in section for the purpose of preventing rotation of one member with respect to the other during raising or lowering of the extensible member.

Still another object of the invention is to provide an enclosed gear box at the upper end of the outer tubular member so that the gear mechanism, which operates to raise or lower the prop, can be packed in grease. The base of the gear box may be configurated so as to contain the general thrust bearing along with a grease seal, means being provided to transmit grease from the grease box to the thrust bearing and to other elements of the operative mechanism housed in the gear box.

Another object has been to provide a structure in which the upper surface of the prop may be disposed almost directly against the floor of the trailer chassis so that the prop tubes may be of maximum length for providing the greatest possible adjustment range.

Another object of this prop is to provide actuating means for changing the reduction ratio to accommodate the operation to different types of loads lifted by the prop and for adjusting the lifting speed to the weight of the load, a high speed being provided when the load is light and a low speed when the load is substantial.

Another object has been to provide a novel arrangement adapted to provide continuous lubrication to the nut and screw mechanism.

Other and further objects and advantages will be apparent from the further and more detailed description of a preferred embodiment of the invention when considered in conjunction with the drawings, in which.

Figure 1:
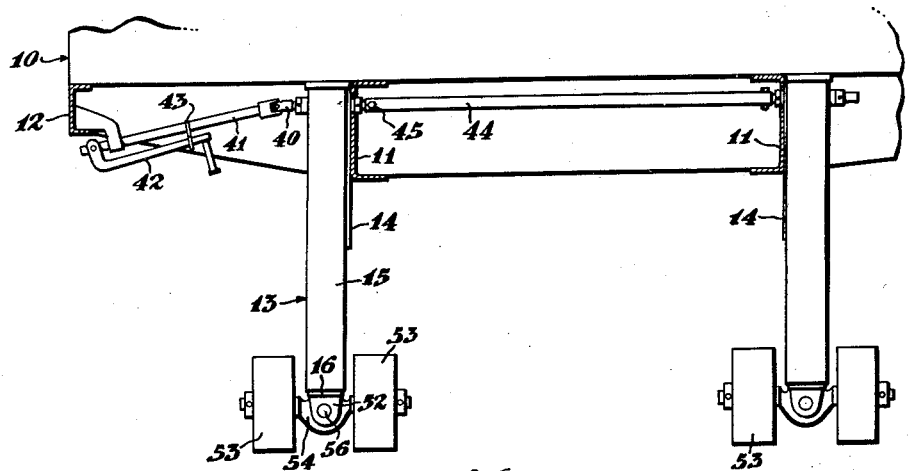
Figure 1 is a front elevation of a structure of the preferred type of the invention in operative position on a semi-trailer body.

In Figure 1 a semi-trailer body of conventional construction is illustrated fragmentarily at 10. The longitudinal channel members of the chassis are indicated at 11—11 and the outer rail of the chassis at 12.

In the construction of the props a pair of telescoping, tubular post assemblies are disposed in a vertical position on the underside of the trailer body and are designated generally at 13. These post assemblies are strong and rigid and carry plates 14 welded to one side toward the top thereof which provide connecting means to the longitudinal channel members 11. This connection may be made by bolts, welding or in any conventional way.

Figure 3:
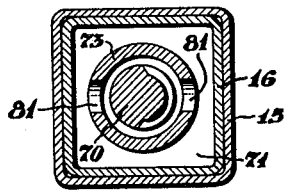
Figure 3 is a sectional plan view taken along the line 3—3 of Figure 2.

Each tubular assembly 13 is comprised of a pair of telescoping, tubular members 15 and 16, the outer member being designated 15 and the inner member 16. Both tubes are square in section (Figure 3) to prevent rotation of one in relation to the other during elevating or lowering. The gear box 17 at the upper end of the outer tubular member 15 is formed by welding a base 18 into the tube and by fastening a top 19 on the uppermost portion of the outer tube so that the gear mechanism, which will be described subsequently, can be packed in grease and lubrication maintained for a considerable period of time.

The inner tubular post 16 is retractable with respect to the outer post 15 by means of a rotatable sleeve 73 (Figure 2) which is mounted within the retractable post 16 and driven by bevel gears. The retractable post 16 is connected to the rotatable sleeve by an elongated stationary screw 70 extending upwardly and threaded into a nut 75 at the lower end of the rotatable sleeve so that, upon rotation of the sleeve, the retractable post is raised or lowered. A novel and advantageous arrangement for supplying lubricating oil to the rotatable sleeve from a reservoir at the lower end of the retractable post 16 is later described in detail. The upper end of the rotatable sleeve 73 is provided with a stud 74 journalled in a bushing 22 confined in the base 18 of the gear box. Keyed to the upper end of stud 74, as at 23, is a bevel gear 24 which is held in position between a washer 25 and a snap ring 26 engaged in a groove at the upper extremity of the stud. The gear box base 18 is counterbored from the underside, as at 28, to receive the general thrust bearing 29 and provide a grease seal. Lubrication bores 33 extend diagonally through the base of the gear box and the bushing 22 to supply grease to the thrust bearing and to the bushing.

Figure 2:
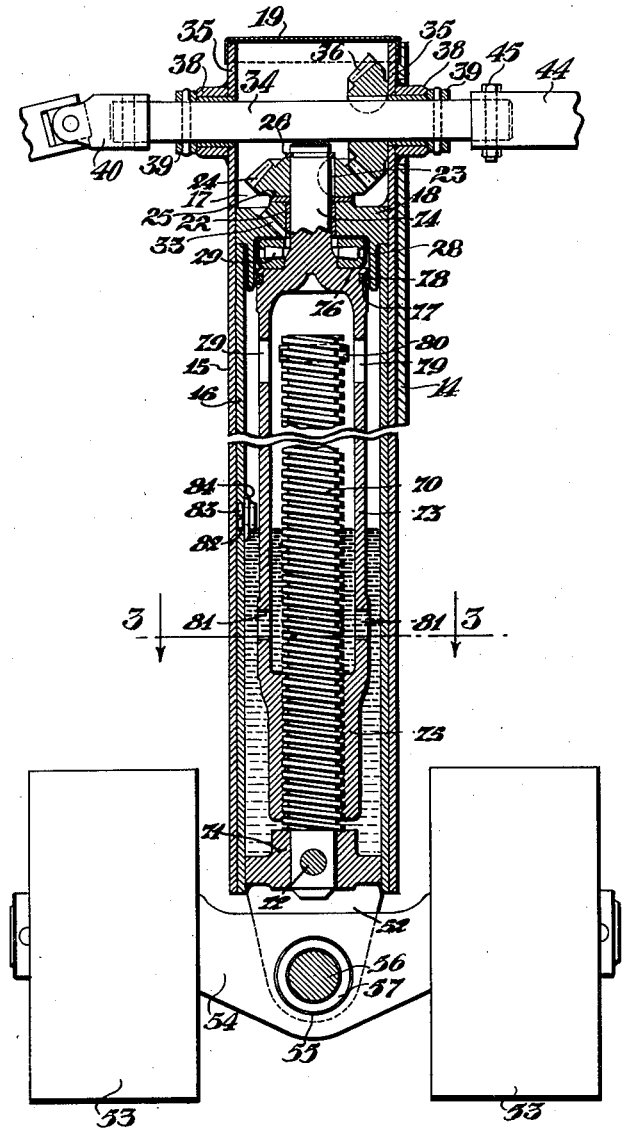
Figure 2 is a cross sectional view through one of the telescoping, tubular prop assemblies.

The upper end of sleeve 73 includes a shoulder 76 seated against the thrust bearing 29. On its outer circumferential face, adjacent the shoulder 76, the sleeve 73 is grooved as at 77, to carry a packing gland 78 which forms a grease seal for the gear box and thrust bearing. The actuating screw 79 engages the nut 75 at the lower end of the sleeve 73 and extends upwardly into the sleeve a substantial distance when the prop is in fully retracted position as illustrated in Figure 2. To facilitate the assembly of the structure, the sleeve is provided with apertures 79—79 adjacent its upper extremity to allow a stop pin 80 to be inserted in the upper end of the screw 70 after the screw is threaded through the nut. The stop pin limits the downward travel of the retractable post 16, thus preventing any possibility of the post being extended downwardly until it becomes disengaged from the outer post 15.

A cross shaft 34 extends horizontally through the side walls 35—35 of the outer tube 15 toward the top thereof and carries a bevel gear 36 keyed thereto internally of the gear box and adapted to mate with the bevel gear 24 fixed to the vertical sleeve stud 74. The cross shaft 34 is journalled in bushings 38—38 welded to the outside of the side walls 35 of the outer tube and is held in position by means of collars 39—39 pinned to the shaft adjacent each bushing 38.

As is readily apparent from the preceding description of the prop structure it is possible to place the upper portion of the prop almost directly against the floor of the trailer chassis so that both the outer and inner tubes are of a length sufficient to provide a maximum adjustment range. With this arrangement the extension of the cross shaft to the exterior of the vehicle frame would ordinarily pass through the outer rail 12 thereby making it impractical to use a conventional crank. Therefore, a universal joint 40 is applied on the side adjacent the outer bearing of the cross shaft and a shaft 41 extends from this joint angularly and downwardly under the outer rail 12, the crank 42 being pivotally carried at the outer end of this shaft. As illustrated in Figure 1, when not in use the crank 42 is swung inwardly and upwardly to a position substantially parallel with the shaft 40 and is held in this position by means of a clip 43. On its inner end the cross shaft is fixed to a pipe 44 by means of a bolt 45. This pipe extends across the underside of the trailer chassis and connects with the cross shaft of the opposite prop to operably join the two. Since the two props are identical the construction and operation has been described in the singular throughout this specification.

As the handle is rotated the cross shafts 34 of the props are actuated by means of the shaft 41 and the pipe 44. Each bevel gear 36 being keyed to its respective cross shaft 34 actuates a sleeve 73 by means of a bevel gear 24. In the position shown in Figure 2, the inner tube 16 is in its elevated position with respect to the outer tube 15.

An inverted U-shaped member 52, welded to the lower extremity of the inner tube, provides a closure for the end and also provides a bracket for a conventional set of rocking prop wheels 53. The axle 54 for the wheels is centrally cross bored as at 55 to provide a center bearing and has its ends turned to provide spindles for the wheels 53. Interposed between the axle 54 and an axle cross shaft 56 is a steelbound rubber bushing 57. This bushing eliminates metal-to-metal shock if the prop is not completely extended before uncoupling takes place.

Figure 4:
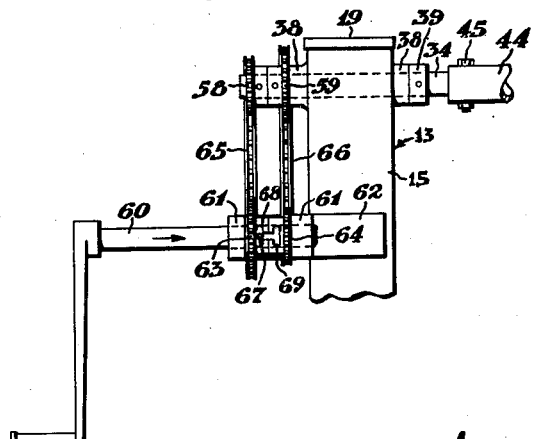
Figure 4 is a fragmentary elevational view of the prop actuating means.

In Figure 4 is illustrated a crank mechanism in which a pair of sprockets 58 and 59 are pinned to the outer end of the cross shaft 34. A sliding crank carrying shaft 60 is journalled in bosses 61—61 provided by a bracket 62 fixed to the outer tube 15. This shaft lies in a plane considerably below the plane of the cross shaft and is substantially parallel therewith. Disposed on the crankshaft 60 between the bosses 61—61 is a pair of floating sprockets 63 and 64 adapted to be operably connected to the sprockets 58 and 59 respectively by chains 65 and 66. A clutch pin 67 fixed in the crankshaft extends outwardly into mating T-slots 68 and 69 provided in the bosses of the sprockets 63 and 64 and is adapted to engage either of these T-slots. Utilizing this arrangement, and employing sprockets of different size as illustrated in Figure 4, it is possible to attain a comparatively high speed for the raising operation when the load to be lifted is light and a comparatively low speed when the load is substantial. It is also possible to omit the outer sprockets 58 and 63 on the two shafts and to pin the sprocket 64 to the crankshaft to provide only one set of mating sprockets connected by the chain 66. By this method it is possible to provide a permanent reduction ratio particularly adapted to the function of each particular vehicle. In each of these modifications the universal joint may be omitted since its function is supplied by the sprocket arrangement.

The lower portion of the inner tube 16 constitutes an oil reservoir for the actuating screw and nut which in conjunction with the rotatable sleeve 73 lubricates the sleeve and nut automatically upon actuation of the prop to promote ease of operation. The cooperation between the rotatable sleeve and the oil reservoir is an important feature of the present invention since it assures adequate and continuous lubrication of the sleeve and screw for prolonged periods of service without replenishment of the oil supply and thus improves greatly the performance of the structure. Apertures 81—81 in the tubular member 73 adjacent the upper extremity of the nut 75 are provided to supply oil to the screw and nut. As illustrated in the drawings, oil enters the apertures 81—81 from the reservoir and upon lowering of the prop a certain amount of oil remains trapped within the tubular member 73 and lubricates the entire length of the actuating screw as it commences to engage the nut 75. Upon raising of the prop, the oil contained in the reservoir reenters the apertures 81—81 to replenish the supply in the tube 73. An aperture 82 in the side wall of the inner tube 16 provides filler means for the oil reservoir. A cap screw 83 is threaded into a boss 84 welded about the inner peripheral edge of the aperture 82.

Each time the retractable member 16 is elevated to the position shown in Figure 2, a fresh charge of oil flows through the openings 81 and is trapped within the sleeve to lubricate the full length of the screw 70 when the post 16 again is adjusted to its extended position. The oil which is thus trapped above the nut adheres naturally to the screw threads as the nut rotates in the direction to lower the post. By virtue of the fact that the oil is sealed within the retractable post, the oil is kept free from contamination by dirt and retains its lubricating efficiency almost indefinitely. Any metallic particles which in the course of service may become commingled with the oil, will settle to the bottom of the reservoir, while clean oil for lubricating the screw and nut is drawn from the upper level of the reservoir. The structure thus supplies oil in a dependable fashion where it is most needed and stores a copious supply in reserve so that very little servicing is necessary.

Having described my invention, I claim:

1. A prop for trailers comprising two tubular telescoping members, one of said members being fixed to the trailer and the other of said members being extensible and carrying wheels for supporting the trailer, an actuating screw rigidly secured within the extensible member in vertical position, an inner tubular member enclosing said actuating screw, a portion of said inner tubular member forming a nut for engagement with the screw, another portion of said inner tubular member being spaced from the screw and from the inner wall of the extensible member and having a port formed therein whereby oil contained in the extensible member will pass into the inner tubular member for lubricating the nut and screw, means for supporting the inner tubular member with respect to the trailer body and means for rotating the inner tubular member for raising and lowering the extensible member.

2. An elevating mechanism for the forward end of a semi-trailer comprising; a stationary hollow post depending from the trailer frame, an elongated rotatable sleeve mounted within said stationary post, said rotatable sleeve having an elevating nut disposed at its lower end, means mounted on the trailer frame for rotating the sleeve and nut, a retractable hollow post telescoped relative to the stationary post, a lubricant reservoir disposed within said retractable post, an elevating screw extending upwardly from the bottom of said reservoir, said elevating screw threaded through said elevating nut whereby rotation of the elongated sleeve and nut translates the screw through the nut to raise and lower the retractable post, the rotatable sleeve having an aperture above the elevating nut whereby lubricant in the reservoir flows inwardly through said aperture to immerse the portion of the screw within the rotatable sleeve when the retractable post is in elevated position and flows outwardly through the aperture as the post is moved to extended position.

3. An elevating mechanism for the forward end of a semi-trailer comprising; a stationary hollow post depending from the trailer frame, an elongated rotatable sleeve disposed within the hollow post and substantially coextensive in length with the hollow post, said rotatable sleeve having an elevating nut disposed at its lower end, means at the upper end of the stationary post for rotating said sleeve and nut, a retractable hollow post non-rotatably telescoped within the stationary post, a lubricant reservoir disposed within said retractable post, means securing the bottom of the reservoir to the extensible member, an elevating screw extending upwardly from the bottom of the reservoir and substantially coextensive in length with the retractable post, said elevating screw threaded through said elevating nut whereby rotation of the nut translates the screw through it to raise and lower the retractable post, the said rotatable sleeve having an inside diameter which is greater than the diameter of the screw to provide an oil trap surrounding the screw, the said rotatable sleeve having an aperture above the elevating nut whereby the lubricant in the reservoir flows into the trap above the nut when the retractable post is in elevated position.

JAMES J. BLACK.

REFERENCES CITED

The following references are of record in the file of this patent:

UNITED STATES PATENTS

| Number | Name | Date |
|---|---|---|
| 1,303,240 | Berry | May 13, 1919 |
| 1,387,563 | Stawicki | Aug. 16, 1921 |
| 1,635,689 | Rauch | July 12, 1927 |
| 1,659,785 | Rodman | Feb. 21, 1928 |
| 2,183,367 | Fow | Dec. 12, 1939 |
| 2,232,187 | Reid | Feb. 18, 1941 |
| 2,246,588 | Harrall | June 24, 1941 |
| 2,348,869 | Wagner | May 16, 1944 |